Oct. 5, 1954  W. J. HEUBOSKI ET AL  2,690,676
BLOOD PRESSURE MEASURING INSTRUMENT
Filed Aug. 11, 1948  2 Sheets-Sheet 2
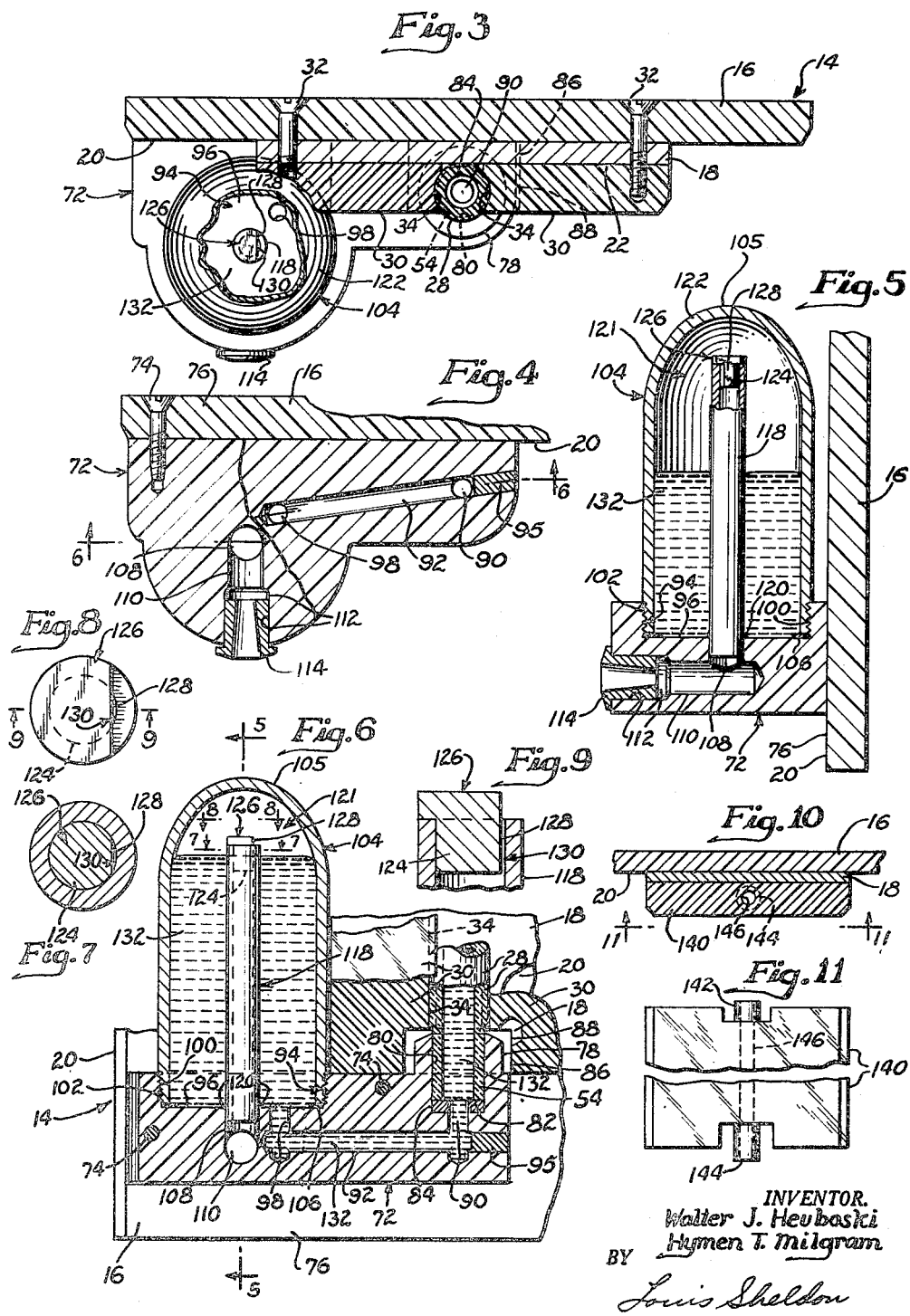

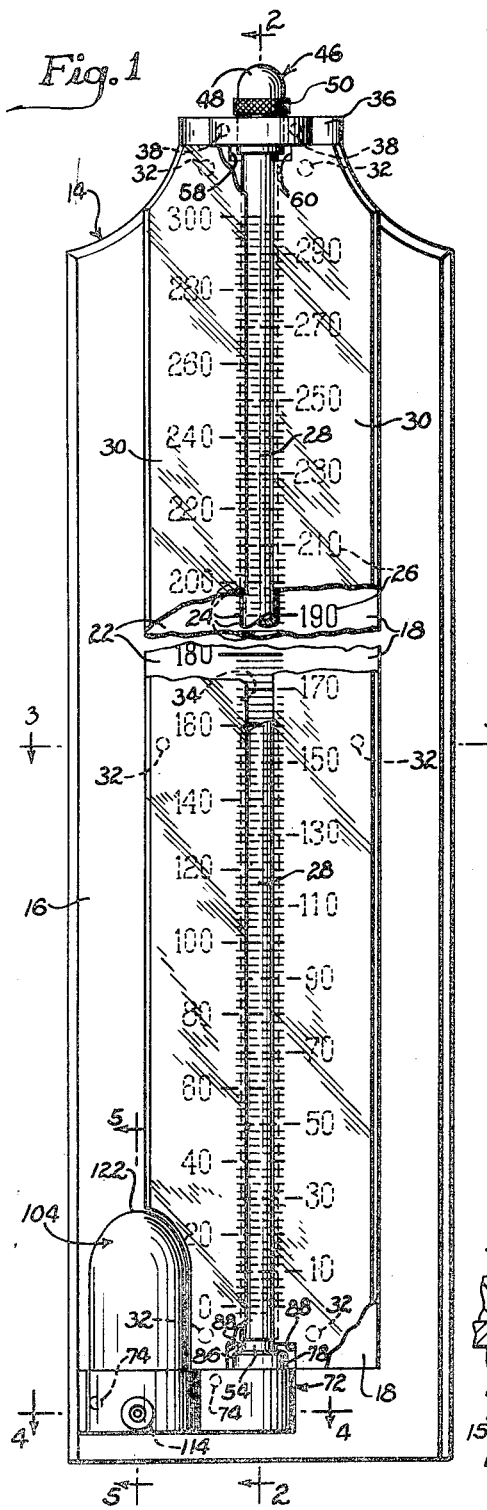

Patented Oct. 5, 1954

2,690,676

UNITED STATES PATENT OFFICE 2,690,676

BLOOD PRESSURE MEASURING INSTRUMENT

Walter J. Heuboski and Hymen T. Milgrom, Chicago, Ill.

Application August 11, 1948, Serial No. 43,684

8 Claims. (Cl. 73—402)

1

This invention relates to physicians' blood pressure indicating instruments of the mercury manometer type.

The conventional manometer type blood pressure instrument used by physicians includes a glass tube. This tube is of course frangible, and when it is broken considerable mercury, which is expensive, is lost. The common practice is to send the instrument to the seller or manufacturer to replace the tube and the lost mercury. Because of the frangibility of such a tube, the placement of the inflation system and particularly its metal parts in the instrument case preparatory to closing it requires great care and caution to guard against breakage of the tube and escape of mercury from the reservoir when the case is closed.

It is an object of our invention to provide an instrument of the character referred to but free of the foregoing drawbacks.

Another object is to provide an instrument of the character mentioned wherein even a frangible mercury column tube is substantially protected from injury or breakage without impairment of visibility of the mercury and pressure graduations.

An additional object is to provide a simple mounting for the tube, enabling the same to be speedily installed and removed, as for the removal of mercury oxidation from the inner wall of the tube or to clean or replace the mercury in the reservoir.

A further object is to provide such an instrument having an infrangible mercury column tube.

It is also an object to provide such an instrument including an infrangible tube which is flexible but is maintained straight.

An additional object is to provide tube-reinforcing means which does not obstruct observation of the tube, mercury coumn or scale thereabove.

It is another object to provide such an instrument in which the sides of the tube are reinforced.

It is also an object to provide novel means for guiding the tube into proper position.

It is a further object to provide a simple yet novel breather for the mercury reservoir.

Another object is to provide a novel mercury reservoir.

Further objects and advantages of the invention will appear as the description proceeds.

The invention will be better understood upon reference to the following description and accompanying drawings, in which:

2

Fig. 1 is a broken front elevational view, on a reduced scale, of an illustrative embodiment of the invention.

Fig. 2 is an enlarged longitudinal view, partly in section and partly in elevation, taken as indicated by the line 2—2 in Fig. 1.

Fig. 3 is a transverse sectional view taken as indicated by the line 3—3 in Fig. 1.

Fig. 4 is a fragmentary transverse sectional view taken as indicated by the line 4—4 in Fig. 1.

Fig. 5 is a fragmentary longitudinal, sectional view taken as indicated by the lines 5—5 in Figs. 1 and 6.

Fig. 6 is a fragmentary longitudinal sectional view taken as indicated by the line 6—6 in Fig. 4.

Fig. 7 is an enlarged transverse sectional view taken as indicated by the line 7—7 in Fig. 6.

Fig. 8 is an enlarged top plan view taken as indicated by the line 8—8 in Fig. 6.

Fig. 9 is a fragmentary longitudinal sectional view taken as indicated by the line 9—9 in Fig. 8.

Fig. 10 is a fragmentary plan sectional view, looking down, of a modified construction.

Fig. 11 is a fragmentary front elevational view taken as indicated by the line 11—11 in Fig. 10.

Fig. 12 is a view similar to Fig. 10 but of another modification.

Referring now more particularly to the drawings, there is shown at 14 an instrument constructed in accordance with one form of our invention. It may be hung on or fastened to a wall or the like or supported in an instrument case, and comprises a rear mounting panel 16, a longitudinal backing strip 18 against the front surface 20 of the panel and bearing on its front surface 22 pressure graduations 24 and corresponding numbers 26, a transparent tube 28 extending along the strip surface 22, transparent plates 30 extending along the strip and straddling and partially confining the tube, and screws 32 or the like securing the panel, strip and plates together. The edges of the plates 30 adjacent the tube 28 are arcuately channeled at 34 and have substantially sliding engagement with spaced portions of the tube, clearance being allowed to permit the tube to be slid longitudinally, only, into and out of place, but the clearance being sufficiently slight to enable the plates to maintain the tube substantially straight and snug or tight.

A block 36 is secured as by screws 38 at the front 20 of the upper end 40 of the panel 16 over the tops of the strip 18 and plates 30 and may be rabbeted at 42 and internally threaded as at 44 for the reception of the external thread 45 of a socket plug 46 which is hollow as shown at 47 and has a knob 48 knurled as at 50 or otherwise suitably fashioned to facilitate turning by hand. The tube 28 is preferably extruded and, since manufacturing variations in diameter may occur, it is preferred to extrude it oversize and machine both terminal portions of the tube somewhat to a reduced and proper size as shown at 52 and 54, the upper terminal 52 being slidably and snugly received in the socket 55 in the lower part of the plug 46 for the reception of which the strip 18 and plates 30 are suitably notched as shown at 58 and 60, respectively.

A breather disc 62 is placed against the annular shoulder 64 at the upper end of the plug socket 55, and a washer gasket 66 is disposed adjacent the lower face of the disc, both being retained by friction or otherwise, the gasket being tightly held by the plug against the upper terminal 52 of the tube 28. The disc 62 permits passage of air between the tube 28 and the atmosphere but prevents escape of mercury from the adjacent end of the tube.

A base block 72 is secured as by screws 74 to the front 20 of the lower end 76 of the panel 16 adjacent the lower ends of the strip 18 and plates 30. The block 72 has an upwardly projecting sleeve boss 78 having a bore 80 with a bottom annular shoulder 82 at which a washer gasket 84 is frictionally or otherwise held. The lower ends of the strip 18 and plates 30 are notched as at 86 and 88 to provide clearance for the boss 78. The lower reduced terminal 54 of the tube has a snug sliding fit in the bore 80 and is adapted to be pressed against the gasket 84 by the plug 46 to provide a seal preventing leakage of air and mercury.

A reduced bore 90 extends down from the shoulder 82 and communicates with the tube 28 seated on the gasket 84. A transverse tunnel 92 is drilled so as to intersect the bore 90 and is then plugged and sealed at its free end as shown at 95 (Figs. 4 and 6). Above the other end of the channel 92 the block 72 is formed with a well 94 having an annular bottom 96 from which an eccentric bore 98 extends down into communication with the channel.

The wall 100 of the well 94 is threaded for engagement with the bottom outer threaded portion 102 of a mercury reservoir bell 104 having a dome 105 and adapted to be screwed down into sealing engagement with an annular gasket 106 seated on the floor 96 of the well. An axial bore 108 communicates with and extends down from the well 95 and intersects an inlet opening 110 communicating with a counter-bore 112 (Fig. 5) opening at the front of the block 72, a ferrule 114 being fitted air-tight within the counter-bore and being formed for the air-tight reception of the usual or other suitable fitting from the air pressure supply bulb and associated apparatus (not shown) adapted to be applied to the limb of the patient.

The lower end of a pipe 118 is tightly fitted in the bore 108 and cement 120 is applied at the juncture to insure against leakage of air and mercury. The pipe 118 extends to the interior 121 of the dome 105. The stem 124 of a preferably headed plug 126 is forced into the upper end of the pipe 118, the plug having a flat 128 providing a space 130 between it and the pipe, said space being sufficiently narrow in cross-section to prevent flow of mercury 132 into the pipe while permitting air to gain access to the interior 121 of the dome 105 above the level of the mercury.

It will now be apparent that air from the hand pump (not shown) enters the fitting 114, passes through the bores 110 and 108, the pipe 118 and space 130 into the interior 121 of the dome 105 and presses on the surface of the mercury 132, which, via the bore 98, tunnel 92 and bore 90, finds its level in the tube 28. The tube 28, being preferably of clear plastic, is infrangible, and is held straight by the plates 30, which are also preferably of clear plastic. Hence the tube 28 may project in front of the plates 30, as shown in Fig. 3, without danger of breakage, and this arrangement enhances the visibility of the mercury.

Although various materials for the different parts may be found suitable, we have found it satisfactory to make the panel 16, blocks 36 and 72 of plastic, the strip 18 of pasteboard or plastic, the tube 28 and plates 30 of transparent plastic, and the bell 104, pipe 118 and plug 126 of metal, the various metallic surfaces exposed to the mercury being coated with lacquer or other suitable means to prevent contact between such surfaces and the mercury.

In accordance with the form of our invention shown in Figs. 10 and 11, the tube 28 and plates 30 of the above described form of the invention are replaced by a single member 140 preferably in the form of a piece of transparent plastic secured as by screws 32 to the backing strip 18 and panel 16, said member having reduced upper and lower extensions 142 and 144 and a bore 146 extending throughout its length, including said extensions, for the reception of mercury, the extensions being receivable in the plug 46 and base block boss 78.

Fig. 12 shows an arrangement similar to the first form of our invention except that here a clear glass tube 150 replaces the plastic tube 28 and the tube-holding and protecting clear plastic plates 152 replace the plates 30. The plates 152 are made sufficiently thick so that the tube 150 is spaced rearward from the front surfaces 154 of the plates so that the latter protect the tube from breakage.

Various modifications coming within the spirit of our invention may suggest themselves to those skilled in the art, and hence, we do not wish to be restricted to the specific forms shown or uses mentioned, except to the extent indicated by the appended claims, which are to be interpreted as broadly as the state of the art may permit.

We claim:

1. A physicians' mercury column type blood pressure indicating instrument comprising a backing bearing a graduated blood pressure scale, a stiff flexible transparent infrangible tube adjacent said scale, a pair of transparent infrangible members connected to said backing adjacent said scale and straddling said tube and having longitudinally extending transversely arcuate edge grooves substantially co-axial with said tube and in which said tube is slidably nested, portions of said tube being disposed between said backing and portions of said members, a mercury reservoir supported by said backing adjacent the bottom of said scale and having a stationary gasketed socket in which the lower terminal of said tube seats, a hollow removable threaded clamping element threadedly supported by said backing adjacent the upper end of the scale and having a socket closed at its upper end by a gasket pervious to air but not to mercury, said element socket receiving the upper terminal of said tube, said clamping element being operative to clamp said tube in said sockets against said gaskets, said members being operative to prevent bulging of said tube, said scale extending behind and being visible through said transparent members adjacent said tube, a portion of said tube of a width at least substantially equal to the interior diameter of said tube and of a length substantially coextensive with said scale projecting forwardly of said members substantially throughout the length of said tube, said members being spaced apart adjacent said scale a distance at least substantially equal to the interior diameter of said tube, whereby the mercury column and the scale thereabove are visible from the front, said tube being removable pursuant to removal of said element for the removal of mercuric oxide from the interior surface of said tube and removal of mercury from said reservoir.

2. A physicians' mercury column type blood pressure indicating instrument comprising a backing bearing a graduated blood pressure scale, a mercury reservoir mounted adjacent the bottom of said scale, said reservoir including a tube-end receiving outlet, means mounted adjacent the top of said scale for clamping a mercury column tube in said outlet, and spaced guiding members mounted adjacent the front of said scale and engageable with laterally spaced front portions of such a tube for guiding the tube into said outlet, said guiding members being disconnected throughout the length of said scale, whereby visibility of the tube, the mercury column therein and the portion of the scale above the mercury column will be unimpaired, the tube-engageable portions of said members being parallel and substantially coextensive with said scale, the distance of said portions of said members from said scale exceeding the distance of the axis of said outlet from said scale, whereby, when a tube is fitted in said outlet between said members, said portions of said members will overlap laterally spaced front portions of the tube.

3. A physicians' mercury column type blood pressure indicating instrument comprising a backing adapted to be upright in use and bearing a graduated blood pressure scale, transparent infrangible means connected to said backing adjacent said scale and having a longitudinal bore and reduced top and bottom extensions affording continuations of said bore, a mercury reservoir mounted adjacent the bottom of said backing and having an outlet socket in which the bottom extension is disposed, and removable means for clamping said bottom extension in said socket and having a socket in which said top extension is clamped by said clamping means, said clamping means including valve breather means for permitting passage of air between said top extension and the atmosphere but obstructing escape of mercury from said top extension.

4. In a physicians' mercury column type blood pressure indicating instrument, a backing bearing a graduated blood pressure scale, a stiff flexible transparent infrangible tube adjacent said scale, a pair of infrangible members connected to said backing adjacent said scale and straddling said tube and having longitudinally extending transversely arcuate edge grooves substantially co-axial with said tube and in which said tube is slidably nested, a mercury reservoir supported by said backing adjacent the bottom of said scale and having a stationary gasketed outlet socket in which the lower terminal of said tube seats, a removable threaded clamping element thread-edly supported by said backing adjacent the upper end of the scale and having a socket closed at its upper end by a gasket accessible to the atmosphere and pervious to air but not to mercury, said element socket receiving the upper terminal of said tube, said clamping element being operative to clamp said tube in said sockets against said gaskets, said members preventing bulging of said tube, at least one of said members being transparent, said scale extending behind and being visible through said transparent member, said tube being removable pursuant to removal of said element for the removal of mercuric oxide from the interior surface of said tube and removal of mercury from said reservoir.

5. A physician's mercury column type blood pressure indicating instrument comprising a backing, a stiff flexible transparent infrangible tube substantially engaging said backing substantially throughout the length of said tube, a pair of substantially stiffer infrangible members connected to said backing and straddling said tube and having longitudinally extending transversely arcuate edge grooves substantially co-axial with said tube and in which said tube is slidably nested, a mercury reservoir adjacent the bottom of and carried by said backing and having a gasketed socket in which the lower terminal of said tube seats, a removable threaded clamping element adjacent the top of and threadedly supported by said backing and having a socket closed at its upper end by a gasket accessible to the atmosphere and pervious to air but not to mercury, said socket receiving the upper terminal of said tube, said clamping element being operative to positively clamp said tube in said sockets against said gaskets, said members preventing bulging of said tube, said tube being removable pursuant to removal of said element for the removal of mercuric oxide from the interior surface of said tube and removal of mercury from said reservoir.

6. A physician's mercury column type blood pressure indicating instrument comprising a backing bearing a graduated blood pressure scale, a stiff flexible normally rectilinear transparent infrangible tube adjacent said scale, a pair of substantially stiffer transparent infrangible members connected to said backing and straddling said tube and having longitudinally extending transversely arcuate edge grooves of the same curvature substantially coaxial with said tube and in which said tube is slidably and telescopically received, a mercury reservoir supported by said backing adjacent the bottom of said scale and having a gasketed outlet socket in which the lower terminal of said tube seats, a removable threaded clamping element threadedly supported by said backing adjacent the upper end of said scale and having a socket closed at its upper end by a gasket accessible to the atmosphere and pervious to air and impervious to mercury, said clamping element being operative to positively clamp said tube in said sockets against said gaskets, said transparent members preventing bulging of said tube, said scale extending behind said transparent members adjacent said tube, said tube being removable pursuant to removal of said clamping element for the removal of mercuric oxide from the interior surface of said tube.

7. In a physicians' mercury column type blood pressure indicating instrument, a backing bearing a graduated blood pressure scale, a pair of infrangible members connected to said backing adjacent said scale, a stiff flexible transparent infrangible tube adjacent said scale and straddled by said members, said members having longitudinally extending edge grooves in which said tube is slidably nested, a mercury reservoir supported by said backing adjacent the bottom of said scale and having a stationary gasketed outlet socket in which the lower terminal of said tube seats, a removable threaded clamping element threadedly supported by said backing adjacent the upper end of the scale and having a socket closed at its upper end by a gasket accessible to the atmosphere and pervious to air but not to mercury, said element socket receiving the upper terminal of said tube, said clamping element being operative to clamp said tube in said sockets against said gaskets, said members preventing bulging of said tube, at least one of said members being transparent, said scale extending behind and being visible through said transparent member; said tube being removable pursuant to removal of said element for the removal of mercuric oxide from the interior surface of said tube and removal of mercury from said reservoir.

8. In a physicians' mercury column type blood pressure indicating instrument, a backing, a stiff flexible transparent infrangible tube substantially engaging said backing substantially throughout the length of said tube, a pair of substantially stiffer infrangible members connected to said backing and straddling said tube and having longitudinally extending edge grooves in which said tube is slidably nested, a mercury reservoir adjacent the bottom of and carried by said backing and having a gasketed socket in which the lower terminal of said tube seats, a removable threaded clamping element adjacent the top of and threadedly supported by said backing and having a socket closed at its upper end by a gasket accessible to the atmosphere and pervious to air but not to mercury, said socket receiving the upper terminal of said tube, said clamping element being operative to positively clamp said tube in said sockets against said gaskets, said members preventing bulging of said tube, said tube being removable pursuant to removal of said element for the removal of mercuric oxide from the interior surface of said tube and removal of mercury from said reservoir.

References Cited in the file of this patent

UNITED STATES PATENTS

| Number | Name | Date |
|---|---|---|
| 1,184,799 | Waser | May 30, 1916 |
| 1,626,790 | Curran | May 3, 1927 |
| 1,819,282 | Dickinson | Aug. 18, 1931 |
| 1,821,902 | Baum | Sept. 1, 1931 |
| 2,021,280 | Bandoly | Nov. 19, 1935 |
| 2,437,861 | Rohr | Mar. 16, 1948 |

FOREIGN PATENTS

| Number | Country | Date |
|---|---|---|
| 596,631 | Great Britain | Jan. 7, 1948 |